(12) United States Patent
Andre

(10) Patent No.: US 11,034,033 B2
(45) Date of Patent: Jun. 15, 2021

(54) MICRO-GRIPPER WITH ONE-PIECE STRUCTURE

(71) Applicant: COMMISSARIAT A L'ENERGIE ATOMIQUE ET AUX ENERGIES ALTERNATIVES, Paris (FR)

(72) Inventor: Johan Andre, Dijon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 214 days.

(21) Appl. No.: 15/929,046

(22) Filed: Sep. 21, 2018

(65) Prior Publication Data

US 2019/0091880 A1    Mar. 28, 2019

(30) Foreign Application Priority Data

Sep. 25, 2017 (FR) ...................... 17 58847

(51) Int. Cl.
*B25J 15/08* (2006.01)
*B25J 15/00* (2006.01)
(Continued)

(52) U.S. Cl.
CPC ........... *B25J 15/08* (2013.01); *B23B 31/1178* (2013.01); *B23B 31/305* (2013.01); *B23B 31/32* (2013.01);
(Continued)

(58) Field of Classification Search
CPC .............................. B25J 15/08; B25J 15/0023
(Continued)

(56) References Cited

U.S. PATENT DOCUMENTS 4,671,553 A * 6/1987 Bertini .................... B25B 5/061
294/100
5,046,773 A * 9/1991 Modesitt ................... B25J 7/00
294/100
(Continued)

FOREIGN PATENT DOCUMENTS

DE    10 2005 046 160 B3    3/2007
DE    10 2012 100 916 A1    8/2013
(Continued)

OTHER PUBLICATIONS

A brief translation of an abstract from the German Publication DE 10201200916A1, published on Aug. 8, 2013.*
(Continued)

*Primary Examiner* — Paul T Chin
(74) *Attorney, Agent, or Firm* — Oblon, McClelland, Maier & Neustadt, L.L.P.

(57) ABSTRACT

A micro-gripper includes a support to which are articulated fingers and an actuating diaphragm, adjusting the spacing of the fingers. The support being circular, the fingers may be arranged in any number around it, and the diaphragm delimits a chamber with the support assembled to an equipment for distributing fluids, the pressure of which elastically deforms the diaphragm and controls a simultaneous movement of variations in spacings of the fingers. If the diaphragm is conical and the fingers link up all around, an independence of the movements of the fingers remains.

12 Claims, 4 Drawing Sheets

Figure 4:
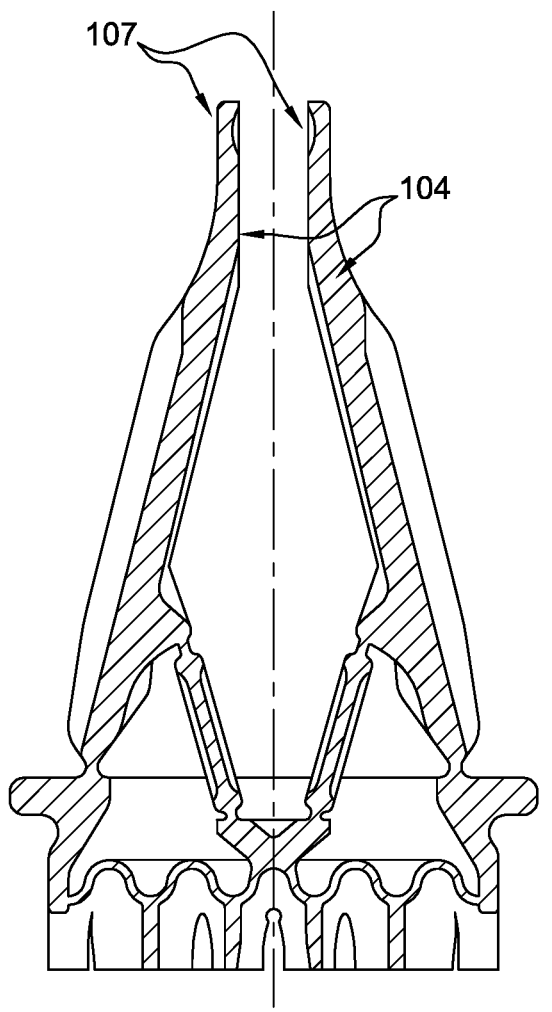

(51) Int. Cl.
*B25J 9/00* (2006.01)
*B23B 31/32* (2006.01)
*B23B 31/117* (2006.01)
*B25J 7/00* (2006.01)
*B23B 31/30* (2006.01)
*B25J 15/12* (2006.01)

(52) U.S. Cl.
CPC ............... *B25J 7/00* (2013.01); *B25J 9/0015* (2013.01); *B25J 15/0023* (2013.01); *B25J 15/12* (2013.01); *B23B 2260/032* (2013.01); *B23B 2260/068* (2013.01); *B23B 2270/06* (2013.01); *B23B 2270/24* (2013.01)

(58) Field of Classification Search
USPC .................................................. 294/100, 99.1
See application file for complete search history.

(56) References Cited

U.S. PATENT DOCUMENTS

| | | | | |
|---|---|---|---|---|
| 5,263,753 A * | 11/1993 | Breu | ................... | B25J 15/0206 294/196 |
| 5,458,388 A * | 10/1995 | Danek | ................... | B65G 47/90 294/100 |
| 8,011,708 B2 * | 9/2011 | Becker | ................ | B25J 15/0226 294/196 |
| 10,661,451 B2 * | 5/2020 | Grossard | .................. | B25J 15/12 |
| 2006/0043749 A1 | 3/2006 | Huang et al. | | |
| 2018/0370044 A1 * | 12/2018 | Zitting | ..................... | B25J 9/142 |
| 2019/0263002 A1 * | 8/2019 | Herrstrom | .................. | B25J 9/14 |

FOREIGN PATENT DOCUMENTS

| | | |
|---|---|---|
| EP | 0 441 060 A2 | 8/1991 |
| WO | WO 99/028094 A1 | 6/1999 |
| WO | WO 02/076685 A1 | 10/2002 |

OTHER PUBLICATIONS

French Preliminary Search Report dated Jun. 15, 2018 in French Application 17 58847 filed on Sep. 25, 2017 (with English Translation of Categories of Cited Documents).

* cited by examiner

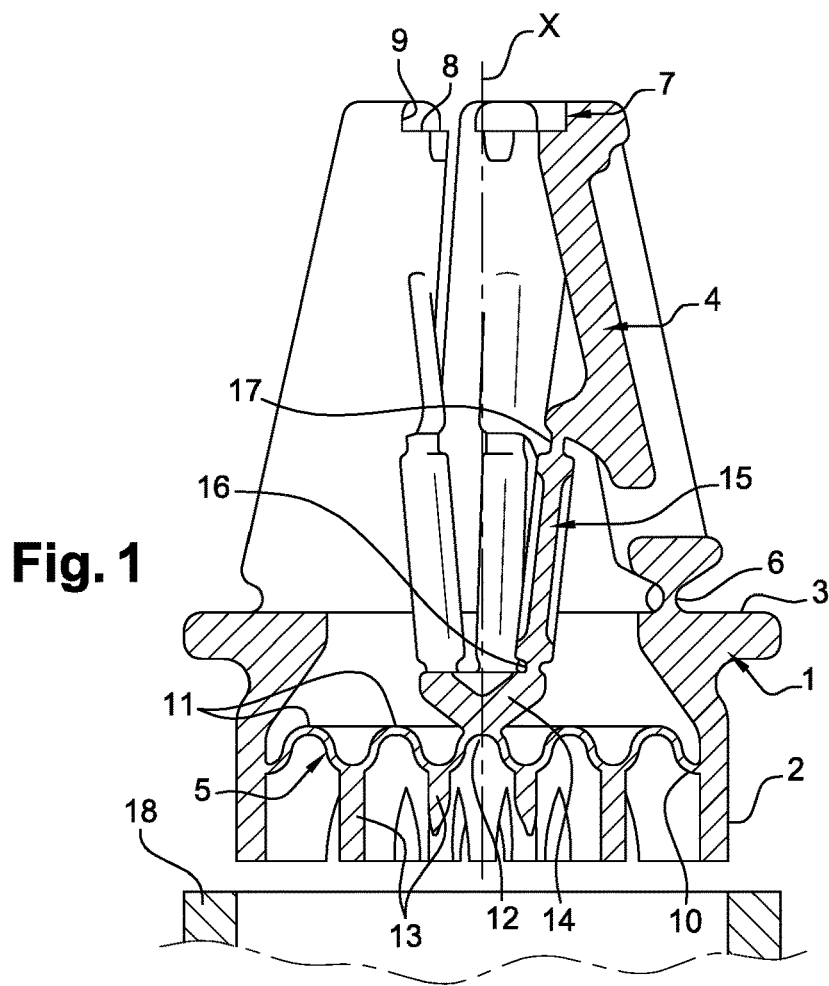
Fig. 1
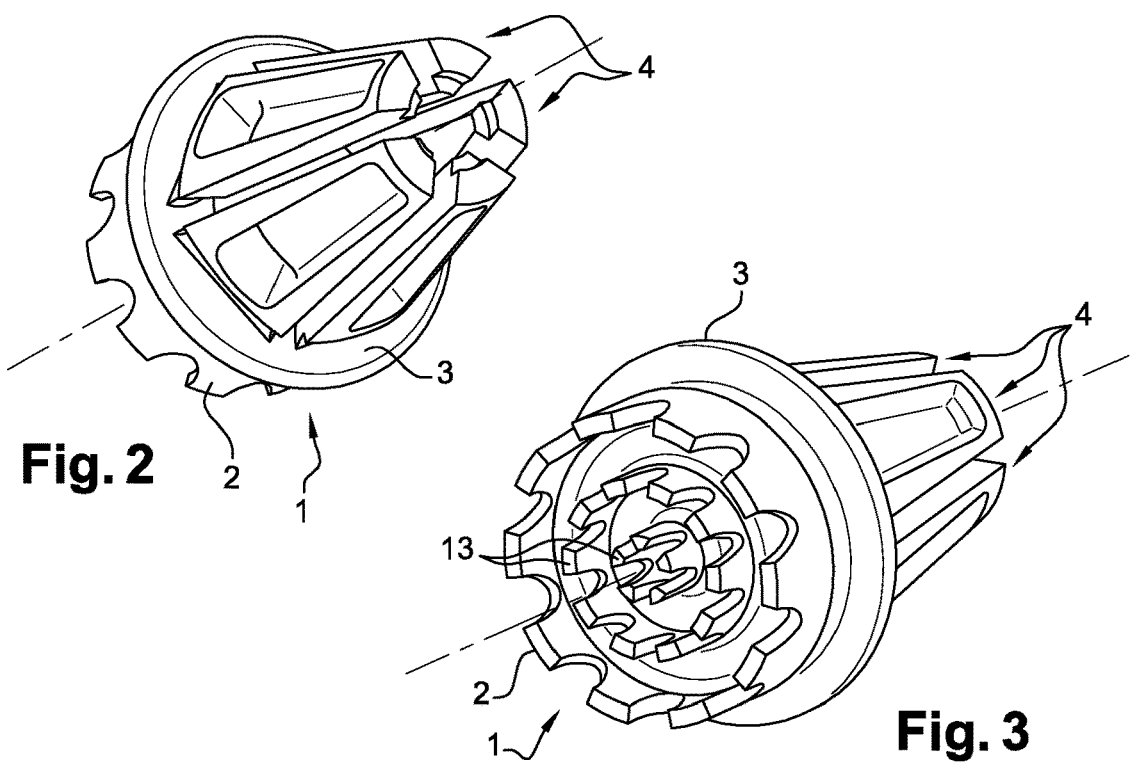
Fig. 2
Fig. 3

MICRO-GRIPPER WITH ONE-PIECE STRUCTURE

The subject of the invention is a micro-gripper with one-piece structure.

The micro-grippers considered here serve to grip small objects, typically of several millimetres, or of the order of a centimetre.

It is awkward to grip such objects by normal grippers in a reliable manner without risk of letting them go or, quite the opposite, subjecting them to excessive clamping effort. The temptation is then to use micro-grippers, with dimensions appropriate to the smallness of the objects to be gripped, in order to satisfy these conditions. The miniaturisation of normal grippers, composed of elements assembled together, may however prove to be difficult, and that is why micro-grippers with one-piece structure have been proposed. An example is given in the document WO 99/28094 A1, where the one-piece structure of the gripper is made of shape-memory alloy, the change of phase of which induces a deformation which leads to the gripping fingers coming closer to each other and accomplishing the clamping of an object. The fingers have a rear edge of which one end is connected to an actuator, which undergoes the most important deformations during the change of phase of the alloy, by a first flexible coupling, and of which the opposite end is connected to a contact element by another flexible coupling. The deformations of the actuator thus cause rotations in opposite directions of the fingers around flexible couplings at the contact elements, and thus variations in their spacing.

Portions of the actuator and contact elements have however to be mounted on a substrate to support the micro-gripper, while enabling it to deform in the desired manner. This mounting may prove difficult to ensure. And the design of this gripper seems quite awkward for obtaining a clearly determined clamping effort, neither insufficient nor excessive, since the exploitation of a shape-memory alloy rather comes down to switching between two invariable spacings of the fingers, whatever the potentially variable dimensions of the objects to be gripped. The properties of the gripper also depend on the manner in which it is fixed to the substrate. Finally, the structure of the gripper, relatively complicated, seems to be able to be obtained only in a two-dimensional shape, with only two opposite fingers capable of clamping only one section of an object, whereas a gripping by more numerous fingers, potentially spread out around a circle, would often be preferable.

The invention has been conceived as an improvement to one-piece micro-grippers in order to be free of such drawbacks, and its aims are to enable gripping of objects by combined movements of several fingers while retaining good control of the efforts and the movements applied, so as to grip the object in a reliable manner, without excessive risk of letting it go or, quite the opposite, breaking it by excessive clamping. The structure of the micro-gripper is one-piece so that it is well adapted to objects of small dimensions. Unlike known micro-grippers, it must also be easy to manufacture, including with a three-dimensional structure, including three fingers or more, arranged around the gripped object.

In a general form, it relates to a micro-gripper with one-piece structure including at least two gripping fingers with variable spacing, a support to which the fingers are joined by flexible couplings and an actuator connected to the fingers and deformable to adjust the spacing of the fingers; the actuator is a flexible diaphragm, and the support comprises a continuous sleeve that can be coupled to an equipment for supplying pressurised fluid and in which the diaphragm is mounted by a continuous contour.

A greater coherence of the micro-gripper is obtained thanks to the support to which the actuator and the fingers are all connected, which makes it possible to transmit with good precision the movements of the actuator to each of the fingers. And the actuating means will be a fluid supplied to a chamber delimited notably by the support and the diaphragm, the pressure of which could be adjusted to control the spacing of the fingers or the clamping effort to values determined and chosen by the user.

According to an original characteristic, the diaphragm is on the whole conical in a free state and extends between the fingers from the contour mounted on the support.

The movements of the fingers then keep a certain independence, thanks to the flexibility of certain constituents of the gripper, of which the conical diaphragm, all around which the fingers can link up at a distance from each other, instead of converging towards a unique one-off zone at the centre of the diaphragm as in other embodiments of micro-gripper: the conical sleeve can more easily accept deformation irregularities translated by different movements of the fingers. Yet such different movements are likely to arise from the moment that the gripper is not perfectly aligned with the object to be gripped or that the object has an irregular shape, and the firmness of the grasping, or even the resistance of the gripper or the object if they are fragile, may be placed in danger if the construction of the gripper prohibits such differences in movements of the fingers. The document DE 10 2012 00916 A1 describes a micro-gripper with flat diaphragm at the centre of which all the fingers converge, which is without this flexibility, and it is recommended to equip each of the fingers with a clamping pressure sensor to reduce the risks of overloading.

In the designs mainly envisaged, the support is annular and the diaphragm is of axisymmetric shape, favourable to uniform clamping movements or efforts for all the fingers. The diaphragm may include circular undulations or ribs which reinforce this axisymmetry and the regularity of its deformations under the pressure of the fluid. It may be on the whole flat in a free state, or, for example, on the whole conical, while then extending between the fingers, from the contour mounted on the support. In this latter case, it may serve to support a base plate on which the gripped object can remain set down, the diaphragm then extending between the contour mounted on the support and an opposite contour which is mounted on this base plate.

The diaphragm could be connected to the gripping fingers by links joined thereto and to the diaphragm by flexible couplings.

As has been mentioned, certain preferred embodiments of the invention include at least three fingers spread out around the support, notably in a regular circle. The problem of ensuring flexibility of the gripper and an authorised difference in the movements of the fingers becomes more acute for these embodiments. It is also possible to use fingers each including an end with two gripping portions, the gripping portions of the different fingers forming a discontinuous circle, and each being able to come into contact with the gripped object. This latter arrangement is very compatible with two fingers opposite to each other. As in designs with at least three fingers, a grasping of the object is achieved over its complete circumference, and it is more secure than graspings at two opposite places of the object, made by two-dimensional micro-grippers.

In certain preferred designs of the invention, the fingers are at a minimum spacing, corresponding to a gripping state when the diaphragm is in a free state, and at greater spacings when the diaphragm is in a state deformed by the fluid. It then suffices to relieve the pressure of the fluid to ensure a stable gripping, with a clamping effort which can be determined as of the design of the gripper, and appropriate to an object provided to be gripped.

The micro-gripper of the invention may notably be produced by a manufacturing technique by addition of material by a numerical control machine, designated three-dimensional printer.

Figure 6:
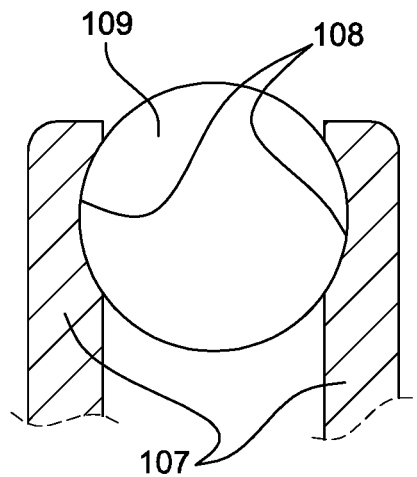
Figure 5:
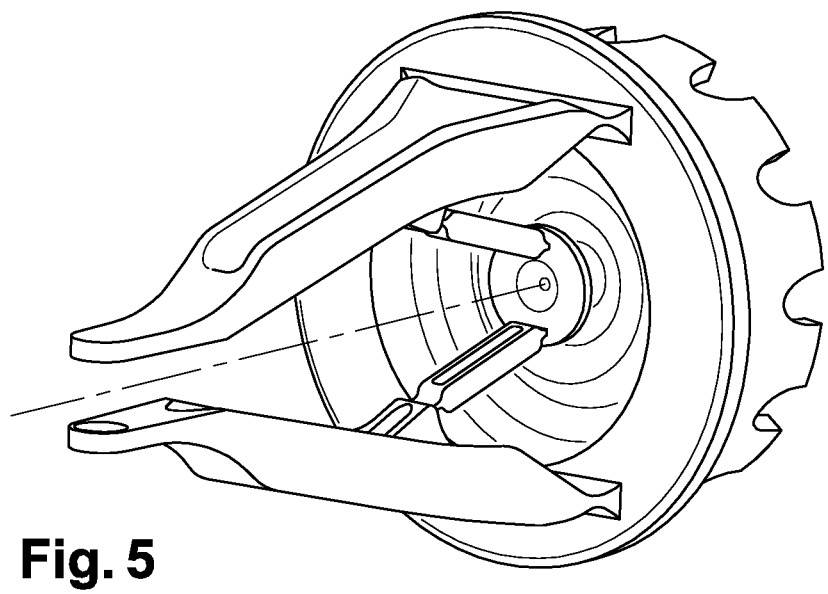
Figure 7:
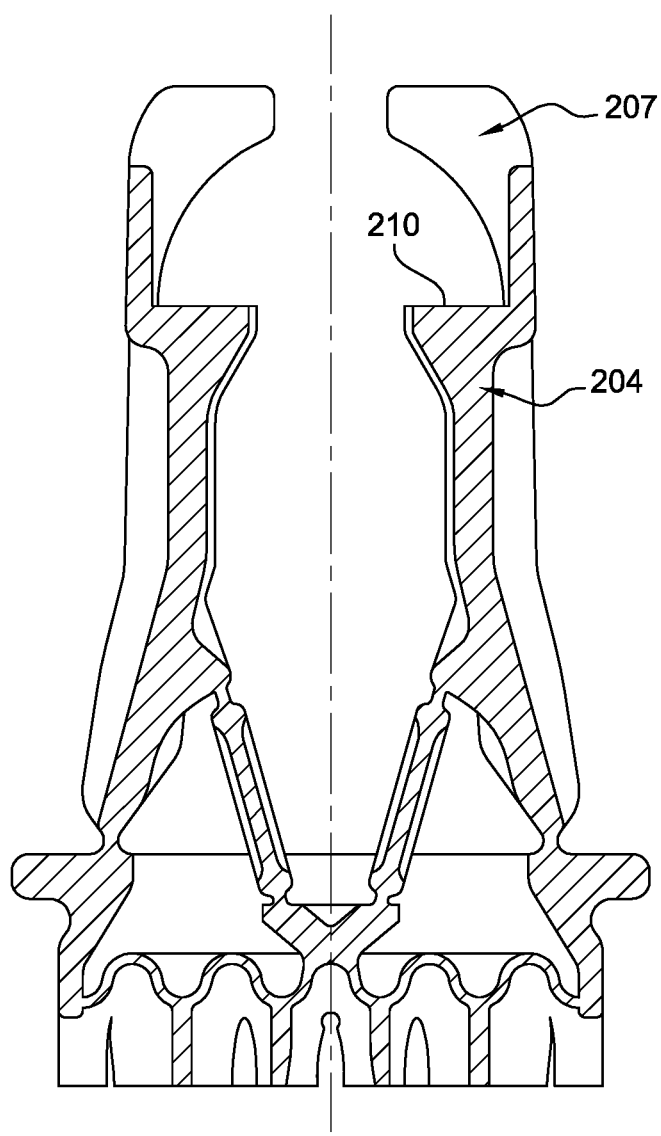
Figure 8:
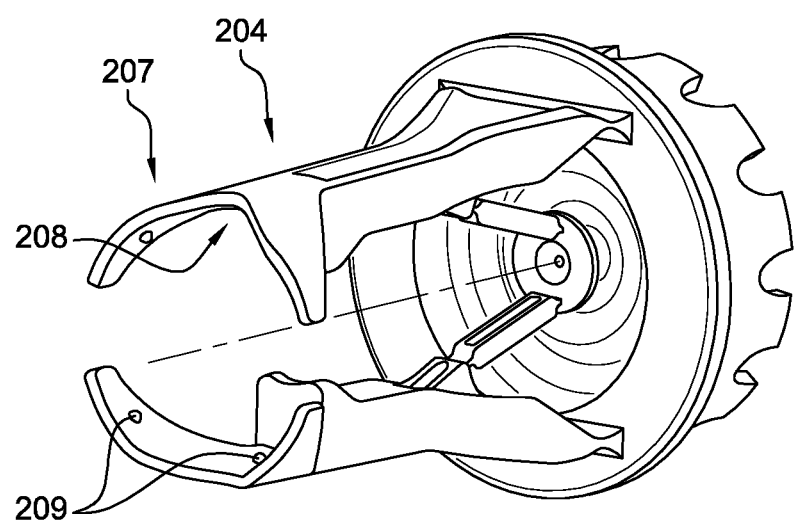
Figure 9:
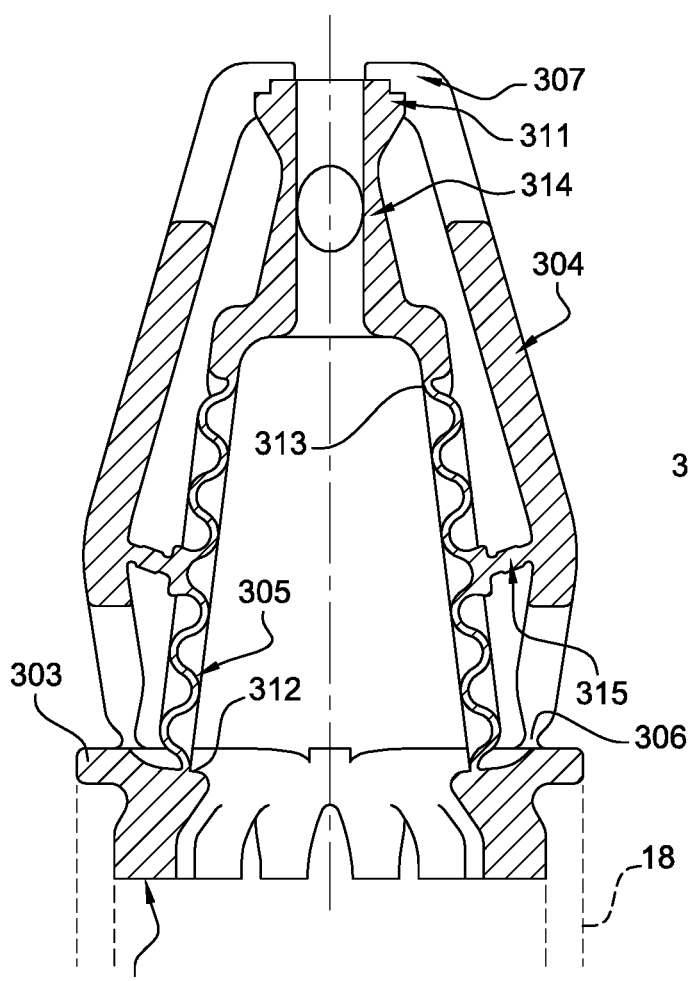
Figure 12:
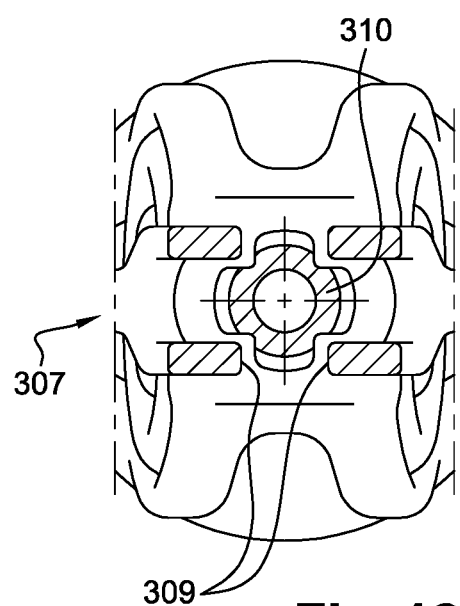
Figure 11:
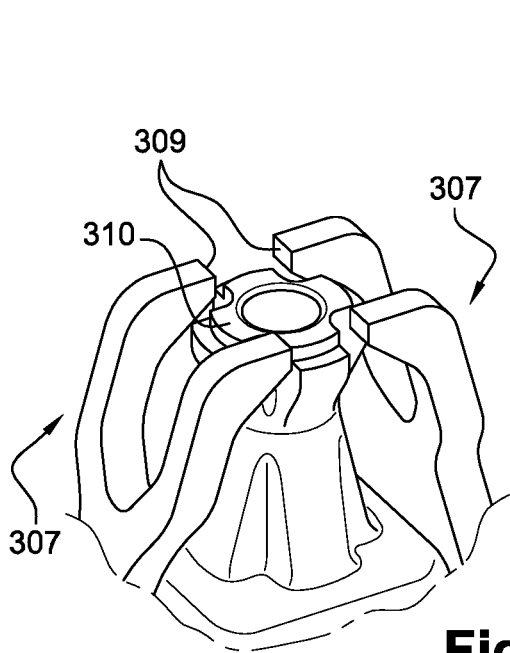
Figure 10:
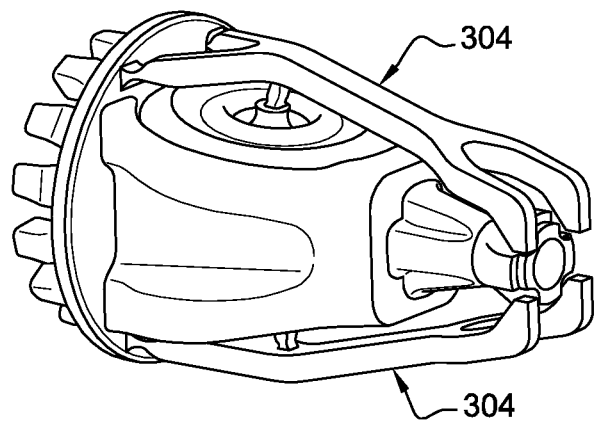

The different aspects, characteristics and advantages of the invention mentioned above, as well as others, will now become clearer from the commentary of the follow figures of certain embodiments thereof, non-exclusive of others:

FIG. 1 represents an axial section of a first embodiment of micro-gripper;

FIGS. 2 and 3, external views in oblique perspective of the front and the rear of the micro-gripper;

FIG. 4, an axial section of a second embodiment;

FIG. 5, an external view in oblique perspective of the front of this latter embodiment of micro-gripper;

FIG. 6, the detail of the end of the fingers;

FIG. 7, an axial section of a third embodiment;

FIG. 8, an external view in oblique perspective of the front of this third embodiment;

FIG. 9, an axial section of a fourth embodiment of the micro-gripper;

FIG. 10, a perspective side view of this fourth embodiment;

FIG. 11, a perspective view of the end of the fingers;

and FIG. 12, a view of the front of the micro-gripper.

A first embodiment of micro-gripper, described by means of the first FIGS. 1 to 3, includes a support 1 of circular structure, including a cylindrical sleeve 2 prolonged towards the front by a flat base plate 3, then fingers 4 for gripping an object, five in number in this embodiment, and a flexible diaphragm 5 for actuating the micro-gripper. The support 1 is a revolving part around which the fingers 4 are uniformly spread out, while being connected to the front face of the base plate 3 by flexible couplings 6. In this description, the front of the micro-gripper corresponds to the direction towards the ends of the fingers 4 and the place where the object is gripped, and flexible will designate constituents of the micro-gripper which are capable of deforming much more than the other constituents, such as the fingers 4 and the support 1 which could be considered as rigid, when a mechanical load is applied to them. In other words, the deformations will be localised almost exclusively on these so-called flexible constituents. The fingers 4 have a conical arrangement and their front ends, opposite to the flexible couplings 6, form jaws 7 for grasping an object. The jaws 7 each include a flat surface 8 directed forwards and an inner surface 9 in an arc of circle, which allow the object to be gripped while being set down thereon and held tightly there between.

The diaphragm 5 is housed in the support 1 and more precisely in the sleeve 2, while having an outer circular contour 10 joined without discontinuity to the inner face thereof. It is essentially flat in the free or rest state, that is to say that it extends in a median plane situated perpendicular to the X axis of the micro-gripper. It is however not flat, but composed of concentric undulations 11 at its centre 12, and it further includes, on the face directed towards the rear of the micro-gripper, ribs 13 also circular and concentric at the centre 12. The structure composed of the support 1 and the diaphragm 5 is thus axisymmetrical to the X axis.

The centre 12 bears a rigid washer 14 connected to each of the fingers 4 by a transmission link 15, provided at its linking ends to the washer 14 and at the finger 4 with flexible couplings 16 and 17.

The micro-gripper is designed so that its support 1 is coupled in a leak tight manner to a tube 18 or analogous equipment which is capable of forming a closed and leak tight chamber with the support 1 and the diaphragm 5, into which a pressurised fluid may be introduced. The pressure of the fluid deforms the diaphragm 5 while making it bulge forwards, with the effect of pushing on the transmission links 15 and tilting the fingers 4 around the flexible couplings 6, moving them away from each other, notably at the location of the jaws 7. By moving apart the jaws 7, it is possible to grip an object or to let go of an object gripped beforehand. By relieving the pressure of the fluid, the micro-gripper, subjected beforehand to elastic loads, returns to the free state in which the fingers 4 are at their minimum spacing, or, if an object has been gripped, it is held tight with a determined and moderate effort. Conversely, the diaphragm 5 may be loaded by a low pressure to directly close the fingers 4. The deformations of the diaphragm 5 are in principle axisymmetric, which the undulations 11 and the ribs 13 favour, but the structure of the micro-gripper is however sufficiently flexible overall to enable a slight independence in the movements of the fingers 4, adapting to potential shape irregularities of the gripped objects.

An alternative embodiment is described by means of FIGS. 4, 5 and 6. It can be distinguished from the preceding mainly in that the fingers, now 104, are only two in number and opposite to each other, and in that their jaws, now 107, include concave surfaces 108 at their inner grasping faces, which are facing each other. This arrangement makes it possible to grip and firmly retain beads 109 between the concave surfaces 108. The remainder of the micro-gripper is unchanged. More generally, the jaws may be designed to have grasping faces having shapes complementary to the shapes of the objects that it is provided to grip. The jaws could thus, for example, have inner faces with cylindrical concavities for gripping cylindrical objects. Two opposite fingers are then perfectly sufficient to retain the gripped object in a secure and stable manner.

Another exemplary embodiment is that of FIGS. 7 and 8, which describe an embodiment that may be distinguished from the preceding in that the fingers, now 204, and still two in number and opposite to each other, include forked jaws 207, each including an outer end curved in an arc 208 with two pointed ends 209 directed towards the other of the jaws 207. Furthermore, the jaws 207 have a flat lower surface 210, for setting down the gripped object. These jaws 207 make it possible to grip easily cylindrical objects, by resting their lower face on the flat surfaces 210 and by holding tight their peripheral surface between the arcs 208, or instead between the tips 209, which are situated approximately in a discontinuous circle while facing each other in pairs, each of the tips 209 facing a tip 209 of the other of the fingers 204.

Another embodiment is described by means of FIGS. 9, 10, 11 and 12. The fingers, now 304, may be analogous to those of the immediately preceding embodiment in that they comprise forked jaws 307, each provided at their ends with two grasping tips 309 which form a circle around the object to be gripped. When the fingers 304 are brought together, pairs of tips 309, situated on the two fingers 307 and facing each other, approach each other to achieve the clamping. The embodiment includes a surface for setting down the object, now 310, which is not placed on the jaws 307, but at the top of an upper pedestal 311 situated between the fingers 304 and separated therefrom. The diaphragm 305 of this embodiment is different and of conical shape, extending along the X axis of the micro-gripper, between a first circular contour, now 312, joined to the support 301 (now at the upper face of its base plate 303), and another contour 313, opposite to the previous contour, joined to the upper pedestal 311. The operation of the device is identical to that of the previous devices, the chamber in which the pressure of the actuating fluid may be established being delimited by the tube 18, the support 301, the diaphragm 305, and now also by the upper pedestal 311, which is here hollowed out, but obstructed by a plug 314. As previously, transmission links, now 315, are used to connect the diaphragm 305 to the fingers 304, but their arrangement is here different, since they are here just about perpendicular to the fingers 304, with an arrangement just about perpendicular to the X axis, and that they do not converge towards each other, but are situated all around the diaphragm 305. The deformation of the latter is thus exerted by a swelling between the contours 312 and 313 in the direction perpendicular to the X axis, with the same effect of moving apart the fingers 304 by tilting them on the support 301 through their flexible link 306 thereto. As previously, the diaphragm 305 is made more rigid by circular undulations concentric to the X axis, which are however superimposed in the axial direction X instead of belonging to a same flat region. The conical shape of the diaphragm 305 and the spacing of the coupling points of the transmission links 315 to the diaphragm 305 enable a certain irregularity of deformation and movement of the fingers 304, beneficial for good gripping of objects since all the fingers 304 can participate in the clamping of objects even of irregular shape, especially if the fingers 304 are numerous, and without excessive efforts being applied.

The micro-gripper of the invention, notably in the embodiments described, will be preferably built using a so-called material addition technique, by a three-dimensional printing machine, the manufacture being facilitated by the simple and largely axisymmetric shape of these constituents. The manufacturing material must be able to undergo repeated elastic deformations in order to switch between its two main states, but no other condition is imposed.

The invention claimed is:

1. A micro-gripper with one-piece structure comprising at least two gripping fingers with variable spacing, a support to which first ends of each of the fingers are joined to the support by flexible couplings of the fingers and an actuator connected to the fingers and deformable to adjust the spacing of the fingers, wherein the actuator is a flexible diaphragm, and the support comprises a continuous sleeve that can be coupled in a leak tight manner to an equipment for supplying pressurised fluid and wherein the diaphragm is mounted by a continuous contour,
wherein the diaphragm is on the whole conical in a free state, wherein the flexible couplings joining the support to the fingers surround the diaphragm, and wherein the diaphragm extends in a volume surrounded by the fingers.

2. The micro-gripper according to claim 1, wherein the support is annular and the diaphragm is axisymmetric.

3. The micro-gripper according to claim 2, wherein the diaphragm includes undulations and/or ribs.

4. The micro-gripper according to claim 1, wherein the diaphragm is on the whole flat in a free state.

5. The micro-gripper according to claim 1, wherein the diaphragm extends between said contour mounted on the support and an opposite continuous contour, mounted on a pedestal including a surface for setting down an object to be gripped by the fingers.

6. The micro-gripper according to claim 1, wherein the diaphragm is connected to the fingers by links joined to the fingers and to the diaphragm by flexible couplings.

7. The micro-gripper according to claim 6, wherein the flexible couplings joining the links to the diaphragm end up in a rigid washer fixed to a centre of the diaphragm, the links having a conical arrangement converging towards the washer.

8. The micro-gripper according to claim 6, wherein the links are substantially perpendicular to the fingers and to the diaphragm.

9. The micro-gripper according to claim 1, wherein the fingers are at least three, spread out around the support.

10. The micro-gripper according to claim 1, characterised in that wherein the fingers each include an end with two gripping tips, the gripping tips of the fingers forming a discontinuous circle.

11. The micro-gripper according to claim 1, wherein the fingers are at a minimum spacing when the diaphragm is in a free state, and at greater spacings when the diaphragm is in a state deformed by the fluid.

12. The micro-gripper according to claim 1, wherein it is produced by a three-dimensional printing machine.

* * * * *